May 6, 1941.  B. DICK  2,241,189
COMBINED FLUID AND MECHANICAL FRICTION BRAKE
Filed Feb. 15, 1940
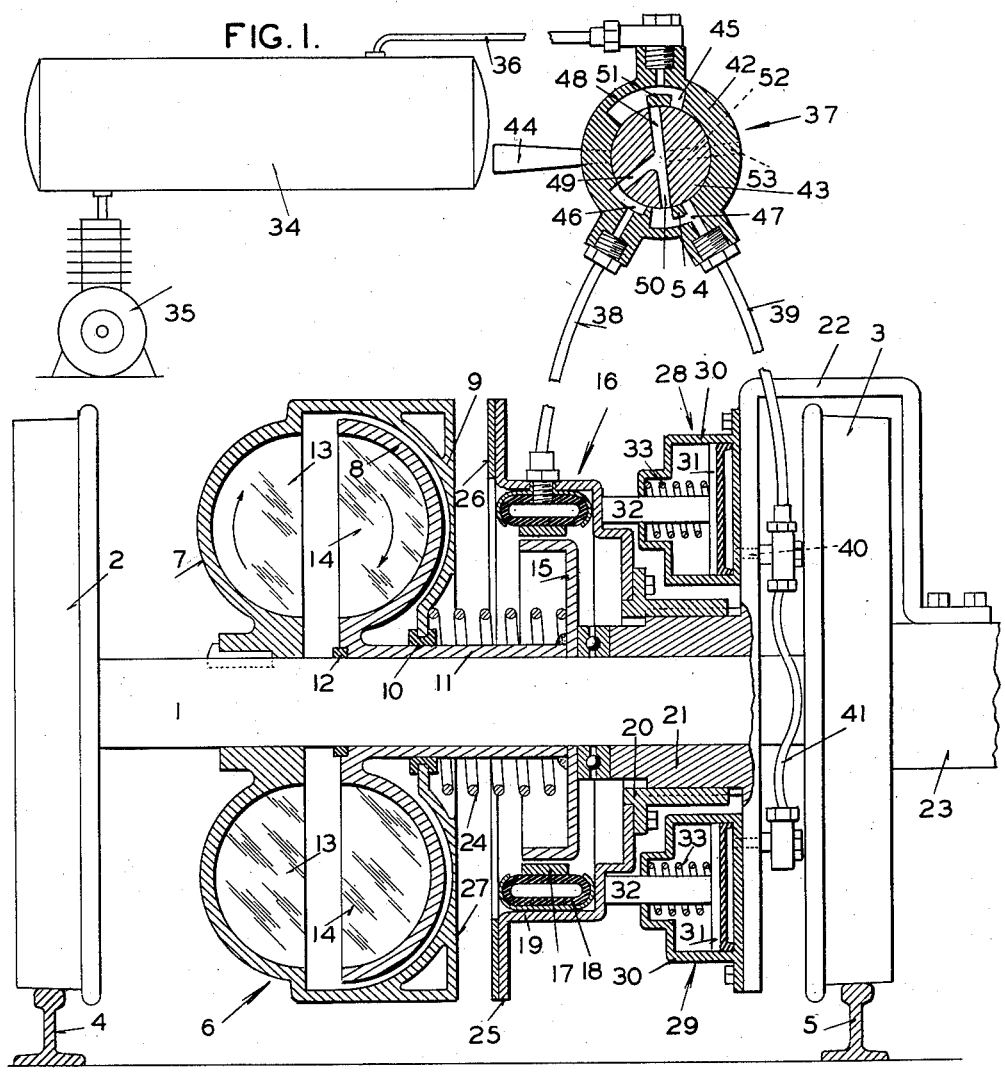
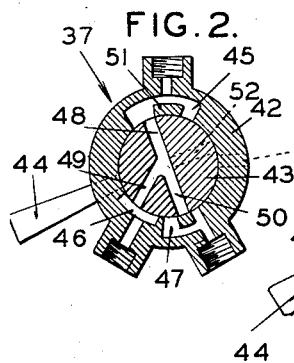
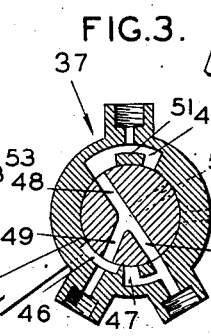
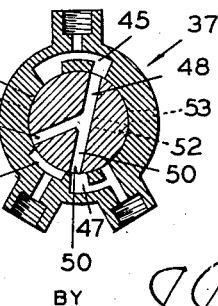
INVENTOR
BURNS DICK
BY
ATTORNEY Patented May 6, 1941

2,241,189

UNITED STATES PATENT OFFICE 2,241,189

COMBINED FLUID AND MECHANICAL FRICTION BRAKE

Burns Dick, Ferguson, Mo., assignor to Wagner Electric Corporation, St. Louis, Mo., a corporation of Delaware Application February 15, 1940, Serial No. 318,992

14 Claims. (Cl. 188—86)

My invention relates to brakes and more particularly to a combination brake employing a fluid braking device and a mechanical braking device.

One of the objects of my invention is to associate with a rotating member a fluid braking device and a mechanical friction braking device and to so control said devices that the rotating member can be efficiently braked under all speed conditions.

Another and more specific object of my invention is to so combine and control a Föettinger type fluid coupling of the kinetic type (hereinafter referred to as a fluid brake) and a mechanical friction brake that they can be made individually or simultaneously effective to brake a rotating member.

Other objects of my invention will become apparent from the accompanying drawing in which Figure 1 is a view partly in section of a combination brake and the control means therefor embodying my invention and Figures 2, 3 and 4 are sectional views showing different positions of the control valve.

I have shown my combination brake as being associated with an axle of a rail vehicle, but it is to be understood that it can be employed to brake any type of vehicle or rotating member where it is found useful.

As shown in Figure 1, the rail vehicle is provided with an axle 1, having wheels 2 and 3 secured to opposite ends thereof and adapted to roll on the rails 4 and 5. Associated with the axle is a fluid brake 6 of the Föettinger fluid coupling design, comprising an impeller element 7 and a turbine element 8. The impeller element is keyed to rotate at all times with the axle and the turbine element is so mounted as to permit relative rotation of the axle. The turbine element is positioned within an extended portion 9 of the impeller element and a seal 10 is associated with said portion and the bearing sleeve 11 of the turbine element to maintain fluid in the brake. There is also provided a second seal 12 between the sleeve of the turbine element and the axle. Both the impeller element and the turbine element are of annular construction and semi-circular in radial cross-section in order to provide a curved path (indicated by the arrows) for the fluid which is in the form of a liquid. The impeller element carries radially extending blades 13 and the turbine element carries similar co-operating radially extending blades 14. The turbine element is capable of being moved axially on the axle in order to increase or decrease the distance between the blades of the two elements. When the blades are adjacent each other the braking torque will be a maximum and when the turbine element is moved away from the impeller element the braking torque will be decreased as is well known in this type of fluid device.

In order that the fluid brake may be employed to brake the wheels of the vehicle means are provided for holding the turbine element stationary. This is accomplished in the construction shown by securing to the outer end of the sleeve 11 of the turbine element a drum 15 forming one element of a brake generally indicated by the numeral 16. The other element 17 of the brake which is adapted to grip the drum 15 is in the form of a band secured to the inner surface of an annular flexible tube 18. This tube is secured to a cylindrical member 19 mounted on a sleeve 20 splined to a member 21 surrounding the axle. The member 21 is fixed against rotation by means of an arm 22 fixed to the frame of the vehicle which in the particular instance shown is the axle bearing box 23. The splined connection between the sleeve 20 and the fixed member 21 permits the cylindrical member 19 to be axially moved toward the fluid brake. If the element 17 should be engaged with the drum 15 the turbine element will be prevented from rotating and will also be simultaneously moved with the cylindrical member when it is moved toward the fluid brake. A spring 24 is interposed between the extension 9 of the impeller element and the drum 15 for normally holding the turbine element at its maximum spaced distance from the impeller element.

The cylindrical member 19 is formed with a flange 25 and secured thereto is a friction lining 26 for cooperation with a flat surface 27 on the extention 9 of the impeller element and when engaged therewith produces a mechanical friction brake for arresting rotation of the axle since the impeller element is keyed to the axle.

In order that the cylindrical member 19 may be moved axially so as to move the turbine element towards the impeller element and close the circuit of the fluid brake to increase the braking torque and also in order to bring the friction lining 26 in engagement with the surface 27 to apply the friction brake there is provided two diametrically positioned fluid motors 28 and 29. Each of these motors comprises a cylinder 30 secured to the fixed member 21 and a piston 31 reciprocable therein. The piston has associated therewith a piston rod 32 which extends out of the cylinder and abuts the cylindrical member 19 and a spring 33 normally biases the piston to an inoperative position in the cylinder. It is thus seen that as the pistons are moved in the cylinders the cylindrical member 19 will be moved axially towards the fluid brake and if the friction brake 16 is engaged it will carry with it the turbine element 8.

In order that the friction brake 16 and the fluid motors 28 and 29 may be properly controlled by a single control member there is provided a fluid pressure actuating system including a single control valve. A fluid pressure tank 34 receives air under pressure from a suitable source, such as the compressor 35 and a conduit 36 leading from the tank is connected through a control valve 37 to two conduits 38 and 39, the former conduit being in communication with the annular flexible member 18 for actuating the brake element 17 and the latter conduit being in communication with the two fluid motors 28 and 29 by means of the branch conduits 40 and 41.

The control valve 37 comprises a fixed cylindrical casing 42 having mounted therein a rotatable stem 43 controlled by a handle 44. The wall of the casing 42 is formed with a chamber 45 which is in constant communication with the conduit 36. On the opposite side of the casing there is also provided a chamber 46 which is in constant communication with the conduit 38 and a second chamber 47 which is in constant communication with the conduit 39. In order that the conduit 36 may be connected to the conduits 38 and 39 in a desired manner the rotatable stem of the valve is provided with three intercommunicating passages 48, 49 and 50. In order to disconnect the passage 48 from the chamber 45 and the conduit 36 leading to the tank when the stem is in its inoperative position the casing 37 is provided with a "cut-off" block 51. There is also provided an exhaust passage 52 in the stem and an exhaust port 53 in the casing for exhausting the flexible tube 18 and the fluid motors when the stem is in its inoperative position. The casing also has a "cut-off" block 54 for disconnecting the passage 50 with the chamber 47 in one position of the stem so that air cannot flow to the fluid motors.

Referring to the operation of the braking apparatus described, when the control valve is in position shown in Figure 1 the parts of the braking mechanism will also be as shown in this figure and the brake will be totally inoperative to arrest the movement of the vehicle since the turbine element 8 is freely rotatable and the friction lining 26 is disengaged from surface 27. The position of the control valve causes the flexible tube 18 and the fluid motors 28 and 29 to be connected to atmosphere through the exhaust port 53. Communication between the air tank and the passage 48 in the valve stem is cut off by the block 51.

If the vehicle is moving at a very high speed the fluid brake is first employed to retard the rotation of the wheels. The use of the friction brake under these conditions would not be advisable since the momentum of the vehicle at a high speed would seriously damage this type of brake. In order to cause the fluid brake alone to be effective as a brake the control valve is moved to the position shown in Figure 2. This will cause the flexible tube of the friction brake 16 to be connected to the tank 34 and as a result thereof the element 17 will be engaged with the drum 15. The turbine element 8 will now be held stationary and the fluid brake will be effective to brake the axle and the wheels of the vehicle. The braking torque established by the fluid brake will be in proportion to the speed of the vehicle and will slow down the vehicle.

If it should be desired to increase the braking action of the fluid brake the control valve is moved to the position shown in Figure 3. The brake 16 will remain engaged and additionally the fluid motors 28 and 29 will be connected to the storage tank. The cylindrical member 19 will now be moved to the left as shown in Figure 1 and carry with it the turbine element 8. This will result in the gap between the two elements of the fluid brake being closed, thereby increasing the braking torque. To continue to have the fluid brake only effective as a brake the fluid motors 28 and 29 are operated only enough to bring the turbine element as close as possible to the impeller element but not to such a position that the friction lining 26 will be engaged with the surface 27 on the impeller element.

As the vehicle slows down under the braking action caused by the fluid brake the braking torque will decrease. When the speed reaches such a value that the friction brake can be used efficiently to supplement the braking action of the fluid brake the fluid motors will be so operated as to bring the brake lining 26 into engagement with the surface 27. The vehicle can now be brought to a "full" stop by the combined braking action of the fluid brake and the friction brake, the friction brake performing the major portion of the braking action as the vehicle approaches the stopped position.

Under some conditions it may be desirable to employ only the friction brake to bring the vehicle to a stop, as, for example, when the vehicle is moving slowing. To permit such operation of the brake the control valve is moved to the position shown in the Figure 4. The fluid motors 28 and 29 only will now be connected with the storage tank, thus causing the cylindrical member 19 to be moved to the left to bring the friction lining 26 in engagement with the surface 27. The turbine element will not be moved with the cylindrical member since the friction brake 16 is not engaged. The vehicle will now be solely under the control of the friction brake since the turbine element of the fluid brake is free to rotate.

Being aware of the possibility of modifications in the particular structure herein described without departing from the fundamental principles of my invention, I do not intended that its scope be limited except as set forth by the appended claims.

Having fully described my invention, what I claim as new and desire to secure by Letters Patent of the United States is:

1. In braking apparatus, a rotating member, a fluid device of the kinetic type associated with the member, a mechanical brake associated with the member, and control means including a single control element for causing either the fluid device or the mechanical friction brake to be effective to brake the rotating member or both to be effective simultaneously.

2. In braking apparatus, a rotating member, a fluid device of the kinetic type associated with the member, a mechanical friction brake associated with the member, and fluid pressure actuated means including a single control member for causing either the fluid device or the mechanical friction brake to be effective to retard the rotating member or both to be effective simultaneously.

3. In braking apparatus, a rotating member, a fluid device of the kinetic type associated with the member, a mechanical friction brake associated with the member, a fluid pressure operated member for causing the fluid device to be operative, a second fluid pressure operated member for causing the mechanical friction brake to be operative, a source of fluid pressure, and control means including a valve for selectively or simultaneously placing the fluid pressure operated members in communication with the source of fluid pressure.

4. In braking apparatus, a rotatable member, a fluid brake associated with the member and comprising an element operatively connected to rotate with the member and a second element adapted to cooperate therewith and forming between them a working chamber for fluid, a fixed member, means for connecting the second element to the fixed member, a friction surface rotatable with the rotatable member, a cooperating friction element anchored against rotation, and control means for causing either said connecting means to be operative or said friction element to be engaged to brake the rotatable member or both to be engaged simultaneously.

5. In braking apparatus, a rotatable member, a fluid brake associated with the member and comprising an element operatively connected to rotate with the member and a second element adapted to cooperate therewith and forming between them a working chamber for fluid, a fixed member, means for connecting the second element to the fixed member, a friction surface rotatable with the rotatable member, a cooperating friction element anchored against rotation, and control means for first causing said connecting means to be operative and subsequently said friction element to be engaged.

6. In braking apparatus, a rotatable member, a fluid brake associated with the member and comprising an element operatively connected to rotate with the member and a second element adapted to cooperate therewith and forming between them a working chamber for fluid, a fixed member, means for connecting the second element to the fixed member, a friction surface secured to the rotatable member, a cooperating friction element anchored against rotation, fluid pressure actuated means for causing the connecting means to be operative, and other fluid pressure actuated means for engaging the friction element.

7. In braking apparatus, a rotatable member, a fluid brake associated with the member and comprising an element operatively connected to rotate with the member and a second element adapted to cooperate therewith and forming between them a working chamber for fluid, a fixed member, means for connecting the second element to the fixed member, a friction surface secured to the rotatable member, a cooperating friction element anchored against rotation, fluid pressure actuated means for causing the connecting means to be operative, other fluid pressure actuated means for engaging the friction element, a source of fluid pressure, and means including valve means for causing the fluid pressure actuated means to be operative independently or simultaneously.

8. In braking apparatus, a rotatable member, a fluid brake associated with the member comprising an element operatively connected to rotate with the member and a second element adapted to cooperate therewith and forming between them a working chamber for fluid, a fixed member, brake means for connecting the second element to the fixed member, means for varying the braking torque between said elements of the fluid brake when the brake connecting means is operative, and control means for causing said brake connecting means to be engaged and then the torque varying means to be controlled.

9. In braking apparatus, a rotatable member, a fluid brake associated with the member comprising an element operatively connected to rotate with the member and a second element adapted to cooperate therewith and forming between them a working chamber for fluid, a fixed member, brake means for connecting the second element to the fixed member, means for varying the braking torque between said elements of the fluid brake when the brake connecting means is operative, a friction brake associated with the rotatable member, and control means for causing said brake connecting means to be engaged, the torque varying means to be controlled and the friction brake to be applied.

10. In braking apparatus, a rotatable member, a fluid brake associated with the member comprising an element operatively connected to rotate with the member and a second element adapted to cooperate therewith and forming between them a working chamber for fluid, a fixed member, brake means for connecting the second element to the fixed member, means for varying the braking torque between said elements of the fluid brake when the brake connecting means is operative, a friction brake associated with the rotatable member, and fluid pressure operated means including a single control valve for causing the brake connecting means to be engaged, the torque varying means to be controlled and the friction brake to be subsequently applied or only the friction brake to be applied.

11. In braking apparatus, a rotatable member, a fluid brake associated with the member and comprising an impeller element secured to the rotatable member and a freely rotatable turbine element adapted to be moved toward and away from the impeller element to vary the braking torque, a fixed member, means for connecting the turbine element to the fixed member, and means for moving the turbine element toward the impeller element when the connecting means is operative.

12. In braking apparatus, a rotatable member, a fluid brake associated with the member and comprising an impeller element secured to the rotatable member and a freely rotatable turbine element adapted to be moved toward and away from the impeller element to vary the braking torque, a fixed member, means for connecting the turbine element to the fixed member, a friction brake associated with the rotatable member, means for moving the turbine element toward the impeller element and subsequently causing the friction brake to be operative, and control means for causing either the connecting means or the last named means to be operative or both simultaneously operative.

13. In braking apparatus, a rotatable member, a fluid brake associated with the member and comprising an impeller element secured to the rotatable member and a freely rotatable turbine element adapted to be moved toward and away from the impeller element to vary the braking torque, a fixed member, means for connecting the turbine element to the fixed member, a friction brake associated with the rotatable member, means for moving the turbine element toward the impeller element, means for causing the brake to be operative, and control means for first causing the connecting means to be operative, secondly the turbine element moved toward the impeller element and lastly the friction brake to be applied.

14. In braking apparatus, a rotatable member, a fluid brake associated with the member and comprising an impeller element secured to the rotatable member and a freely rotatable turbine element adapted to be moved toward and away from the impeller element to vary the braking torque, a fixed member, means for connecting the turbine element to the fixed member, a fluid motor for causing the connecting means to be operative, a friction brake associated with the rotatable member, a fluid motor for moving the turbine element toward the impeller element and for causing the brake to be operative, a source of pressure, and means including valve means for causing the fluid motors to be operative independently or simultaneously.

BURNS DICK.